United States Patent
Yambal et al.

(10) Patent No.: US 9,183,537 B2
(45) Date of Patent: Nov. 10, 2015

(54) CONTENT AUTHORING AND DEPLOYMENT TECHNOLOGY

(75) Inventors: Sachin Yambal, Bangalore (IN); Jitendra J. Jain, Pune (IN); Madhur Kapoor, Pune (IN); Sunjeet Gupta, Maharashtra (IN)

(73) Assignee: Accenture Global Services Limited, Dublin (IE)

( * ) Notice: Subject to any disclaimer, the term of this patent is extended or adjusted under 35 U.S.C. 154(b) by 935 days.

(21) Appl. No.: 13/363,417

(22) Filed: Feb. 1, 2012

(65) Prior Publication Data

US 2012/0216108 A1   Aug. 23, 2012

(30) Foreign Application Priority Data

Feb. 19, 2011   (IN) .............................. 482/CHE/2011

(51) Int. Cl.
*G06F 17/00* (2006.01)
*G06Q 10/10* (2012.01)

(52) U.S. Cl.
CPC ...................................... *G06Q 10/10* (2013.01)

(58) Field of Classification Search
CPC ............................ G06F 17/3089; G06Q 10/10
USPC ........................................................ 715/234
See application file for complete search history.

(56) References Cited

U.S. PATENT DOCUMENTS

| | | | |
|---|---|---|---|
| 7,383,320 B1* | 6/2008 | Silberstein et al. | 709/219 |
| 2002/0073180 A1* | 6/2002 | Dewhurst et al. | 709/220 |
| 2002/0184359 A1* | 12/2002 | Kaneko et al. | 709/223 |
| 2004/0107401 A1* | 6/2004 | Sung et al. | 715/500.1 |
| 2005/0065851 A1* | 3/2005 | Aronoff et al. | 705/15 |
| 2005/0070259 A1* | 3/2005 | Kloba et al. | 455/414.2 |
| 2007/0150447 A1* | 6/2007 | Shah et al. | 707/3 |
| 2007/0240037 A1* | 10/2007 | Law-How-Hung et al. | 715/513 |
| 2008/0005344 A1* | 1/2008 | Ford et al. | 709/230 |
| 2008/0028302 A1* | 1/2008 | Meschkat | 715/255 |
| 2009/0006996 A1* | 1/2009 | Saha et al. | 715/765 |
| 2009/0144753 A1* | 6/2009 | Morris | 719/318 |
| 2009/0182567 A1* | 7/2009 | Stine et al. | 705/1 |
| 2009/0259991 A1* | 10/2009 | Mu | 717/121 |
| 2010/0058170 A1* | 3/2010 | Demant et al. | 715/234 |
| 2010/0179833 A1* | 7/2010 | Roizen et al. | 705/3 |
| 2011/0022528 A1* | 1/2011 | Hennessy | 705/319 |
| 2011/0040390 A1* | 2/2011 | Blevins et al. | 700/18 |
| 2012/0137214 A1* | 5/2012 | Haubrich | 715/243 |
| 2012/0159430 A1* | 6/2012 | Waldbaum et al. | 717/106 |
| 2012/0216108 A1* | 8/2012 | Yambal et al. | 715/234 |
| 2014/0006913 A1* | 1/2014 | Gopalakrishna et al. | 715/200 |

* cited by examiner

*Primary Examiner* — Kavita Padmanabhan
*Assistant Examiner* — Zaida I Marrero
(74) *Attorney, Agent, or Firm* — Fish & Richardson P.C.

(57) ABSTRACT

Content authoring and deployment, in which mobile authoring templates that enable a user to make updates to a subset of a web page using a mobile device are generated and provided to a mobile device application. Configuration data that defines operations needed to publish content updates received through the mobile authoring templates is stored. When input defining a content update entered into a particular mobile authoring template is received, the configuration data associated with the particular mobile authoring template is accessed and content management services needed to publish the received content update to a web page are invoked. Content is published to the web page to reflect the received content update made on the mobile device using the particular mobile authoring template.

20 Claims, 10 Drawing Sheets

CONTENT AUTHORING AND DEPLOYMENT TECHNOLOGY

CROSS-REFERENCE TO RELATED APPLICATION

The present application claims the benefit of Indian Patent Application No. 482/CHE/2011, filed on Feb. 19, 2011, which is incorporated herein by reference in its entirety for all purposes.

FIELD

This disclosure relates to content management technology.

BACKGROUND

A company may use a content management system to manage content the company provides over a network, such as through the company's web site. The content management system may be difficult to update easily and may require a traditional computer to make updates to the company's web site through the content management system.

SUMMARY

In one aspect, a system includes at least one processor and at least one memory coupled to the at least one processor having stored thereon instructions which, when executed by the at least one processor, causes the at least one processor to perform. The operations include generating a mobile authoring template that includes pre-defined interface controls that are configured to enable a user to make updates to a subset of a web page using a mobile device. A unique identifier is associated with the generated mobile authoring template, and the generated mobile authoring template is provided to a mobile device application operating on a mobile device. Configuration data is stored in association with the unique identifier, the configuration data defining operations needed to publish content updates received through the generated mobile authoring template to the web page. The operations further include receiving, from the mobile device application, input defining a content update entered into the generated mobile authoring template using the mobile device, the input including the unique identifier associated with the generated mobile authoring template. In response to receiving the input defining the content update, the operations include accessing the configuration data based on the unique identifier. Based on the configuration data, content management services needed to publish the received content update to the web page are invoked, and content is published to the web page to reflect the received content update made on the mobile device using the generated mobile authoring template.

Implementations may include one or more of the following features. Associating the unique identifier with the generated mobile authoring template may include embedding the unique identifier in the generated mobile authoring template to enable identification of the generated mobile authoring template when content updates are received through the generated mobile authoring template. Receiving, from the mobile device application, input defining a content update entered into the generated mobile authoring template using the mobile device may include receiving, from the mobile device application, a version of the generated mobile authoring template that includes a content update entered using the mobile device and that has the unique identifier embedded. Accessing the configuration data based on the unique identifier may include extracting the unique identifier embedded in the received version of the generated mobile authoring template that includes the content update, identifying configuration data for the extracted identifier, and retrieving the identified configuration data.

In some implementations, storing configuration data in association with the unique identifier may include receiving user input describing operations needed to publish content updates received through the generated mobile authoring template to the web page. Based on the received user input, a configuration file may be generated that defines all of the operations needed to publish content updates received through the generated mobile authoring template to the web page. The configuration file may be stored in electronic storage in association with the unique identifier. Accessing the configuration data based on the unique identifier may include searching configuration files for the configuration file associated with the unique identifier, identifying the configuration file associated with the unique identifier based on the searching, and retrieving, from the electronic storage, the configuration file associated with the unique identifier. Invoking content management services needed to publish the received content update to the web page may include invoking content management services defined within the retrieved configuration file. In some implementations, the configuration file is highly secure and requires authentication/authorization and audit rules for access to the configuration file. Secure access to the configuration file can be managed by an identity management system based on policies for accessing resources, user information in terms of roles and groups and user's access rights to match the same. In some implementations, each user is registered within the identity management system before downloading the authoring templates with relevant roles and access rights to access the resource.

In some implementations, the system may include multiple, different connectors that enable the system to connect with multiple, different types of content management systems. Publishing content to the web page to reflect the received content update made on the mobile device using the generated mobile authoring template may include selecting, from among the multiple, different connectors, a connector for a content management system that manages content included on the web page, and using the selected connector to transfer the received content update to the content management system that manages content included on the web page. The system may be configured to add a new connector to support a new content delivery channel and publish content to the new content delivery channel using the new connector. Publishing content to the web page to reflect the received content update made on the mobile device using the generated mobile authoring template may include enabling an update to the web page managed by a content management system from a user that is in a location in which a broadband internet connection is unavailable.

In some implementations, generating the mobile authoring template may include generating multiple, different mobile authoring templates that each includes pre-defined interface controls that are configured to enable a user to make updates to a subset of a web page using a mobile device. The multiple, different mobile authoring templates may be generated for multiple, different types of content management systems and enable updates to multiple, different web pages. Associating a unique identifier with the generated mobile authoring template may include associating a unique identifier with each of the multiple, different mobile authoring templates. Providing the generated mobile authoring template to a mobile device application operating on a mobile device may include providing the multiple, different mobile authoring templates to a mobile device application operating on a mobile device of a user. Receiving, from the mobile device application, input defining a content update may include receiving, from the mobile device application, input defining a content update made using one of the multiple, different mobile authoring templates selected by the user in accordance with which of the multiple, different web pages the user desires to update. Accessing the configuration data based on the unique identifier may include accessing configuration data for the unique identifier associated with the mobile authoring template selected by the user.

In some implementations, invoking content management services needed to publish the received content update to the web page may include converting the content update into a proper format and structure for integration into the web page. Invoking content management services needed to publish the received content update to the web page may include determining whether a content management system supporting the web page requires synchronous or asynchronous transactions. Publishing content to the web page to reflect the received content update made on the mobile device using the generated mobile authoring template may include in response to a determination that the content management system supporting the web page requires synchronous transactions, publishing content using a synchronous transaction; and in response to a determination that the content management system supporting the web page requires asynchronous transactions, publishing content using an asynchronous transaction.

In some implementations, invoking content management services needed to publish the received content update to the web page may include validating that the content update includes appropriate information for the content update, and transforming the content update into a form appropriate for incorporation into the web page. Publishing content to the web page to reflect the received content update made on the mobile device using the generated mobile authoring template may include determining publishing activities needed to publish the transformed content update into the web page, and publishing the transformed content update into the web page using the determined publishing activities. Determining publishing activities needed to publish the transformed content update into the web page may include determining, from among multiple, possible destination devices, a destination device for publishing the transformed content update into the web page, the multiple, possible destination devices including at least a database and a file server. Publishing the transformed content update into the web page using the determined publishing activities may include publishing the transformed content update to the determined destination device.

In some implementations, invoking content management services needed to publish the received content update to the web page may include invoking an authorization service to confirm authorization to publish the content update. Invoking content management services needed to publish the received content update to the web page may include invoking a syndication service. Invoking content management services needed to publish the received content update to the web page may include invoking authorization, validation, syndication, and conversion services.

In some implementations, publishing content to the web page to reflect the received content update made on the mobile device using the generated mobile authoring template may include integrating the received content update made on the mobile device using the generated mobile authoring template into other enterprise content included in the web page.

In some implementations the operations may include, in response to receiving the input defining the content update, determining an identity of the user attempting to make the content update; determining whether the user attempting to make the content update is authorized to make the content update; in response to a determination that the user attempting to make the content update is authorized to make the content update, processing the content update; and in response to a determination that the user attempting to make the content update is not authorized to make the content update, generating an error condition and preventing the content update.

In some implementations the operations may include, in response to receiving the input defining the content update, placing the content update in a queue until content management services are available to process the content update.

In another aspect, a method includes generating, by a content management server system that includes at least one processor, a mobile authoring template that includes pre-defined interface controls that are configured to enable a user to make updates to a subset of a web page using a mobile device. The method also includes associating, by the content management server system, a unique identifier with the generated mobile authoring template. The method also includes providing, by the content management server system, the generated mobile authoring template to a mobile device application operating on a mobile device. The method also includes storing, by the content management server system, configuration data in association with the unique identifier, the configuration data defining operations needed to publish content updates received through the generated mobile authoring template to the web page. The method also includes receiving, from the mobile device application at the content management server system, input defining a content update entered into the generated mobile authoring template using the mobile device, the input including the unique identifier associated with the generated mobile authoring template. In response to receiving the input defining the content update, the method includes accessing, by the content management server system, the configuration data based on the unique identifier. Based on the configuration data, the method includes invoking, by the content management server system, content management services needed to publish the received content update to the web page. The method also includes publishing, by the content management server system, content to the web page to reflect the received content update made on the mobile device using the generated mobile authoring template.

In yet another aspect, at least one computer-readable storage medium is encoded with executable instructions that, when executed by at least one processor, cause the at least one processor to perform operations. The operations include accessing user story information that was inputted by a user into a pre-defined template designed to receive a user story, the user story being a software system requirement formulated as one or more sentences in an everyday or business language of the user. The operations also include generating a mobile authoring template that includes pre-defined interface controls that are configured to enable a user to make updates to a subset of a web page using a mobile device. The operations also include associating a unique identifier with the generated mobile authoring template. The operations also include providing the generated mobile authoring template to a mobile device application operating on a mobile device. The operations also include storing configuration data in association with the unique identifier, the configuration data defining operations needed to publish content updates received through the generated mobile authoring template to the web page. The operations also include receiving, from the mobile device application, input defining a content update entered into the generated mobile authoring template using the mobile device, the input including the unique identifier associated with the generated mobile authoring template. In response to receiving the input defining the content update, the operations include accessing the configuration data based on the unique identifier. Based on the configuration data, the operations include invoking content management services needed to publish the received content update to the web page. The operations also include publishing content to the web page to reflect the received content update made on the mobile device using the generated mobile authoring template.

The details of one or more implementations are set forth in the accompanying drawings and the description, below. Other potential features and advantages of the disclosure will be apparent from the description and drawings, and from the claims.

BRIEF DESCRIPTION OF THE DRAWINGS

Like reference numbers represent corresponding parts throughout.

DETAILED DESCRIPTION

In some implementations, a system for authoring and deploying content enables users to maintain and update web sites by using mobile device applications. In these implementations, the content authoring and deploying system generates mobile authoring templates that include interface controls enabling users to make web page updates, and stores configuration data related to the templates. The templates are provided to the mobile device applications. Users can interact with the applications, using interfaces associated with the templates to update content. Content update information is received from the mobile device application. Based at least in part on the stored configuration data, content management services are invoked to publish the received content update information to one or more web pages.

Figure 1:
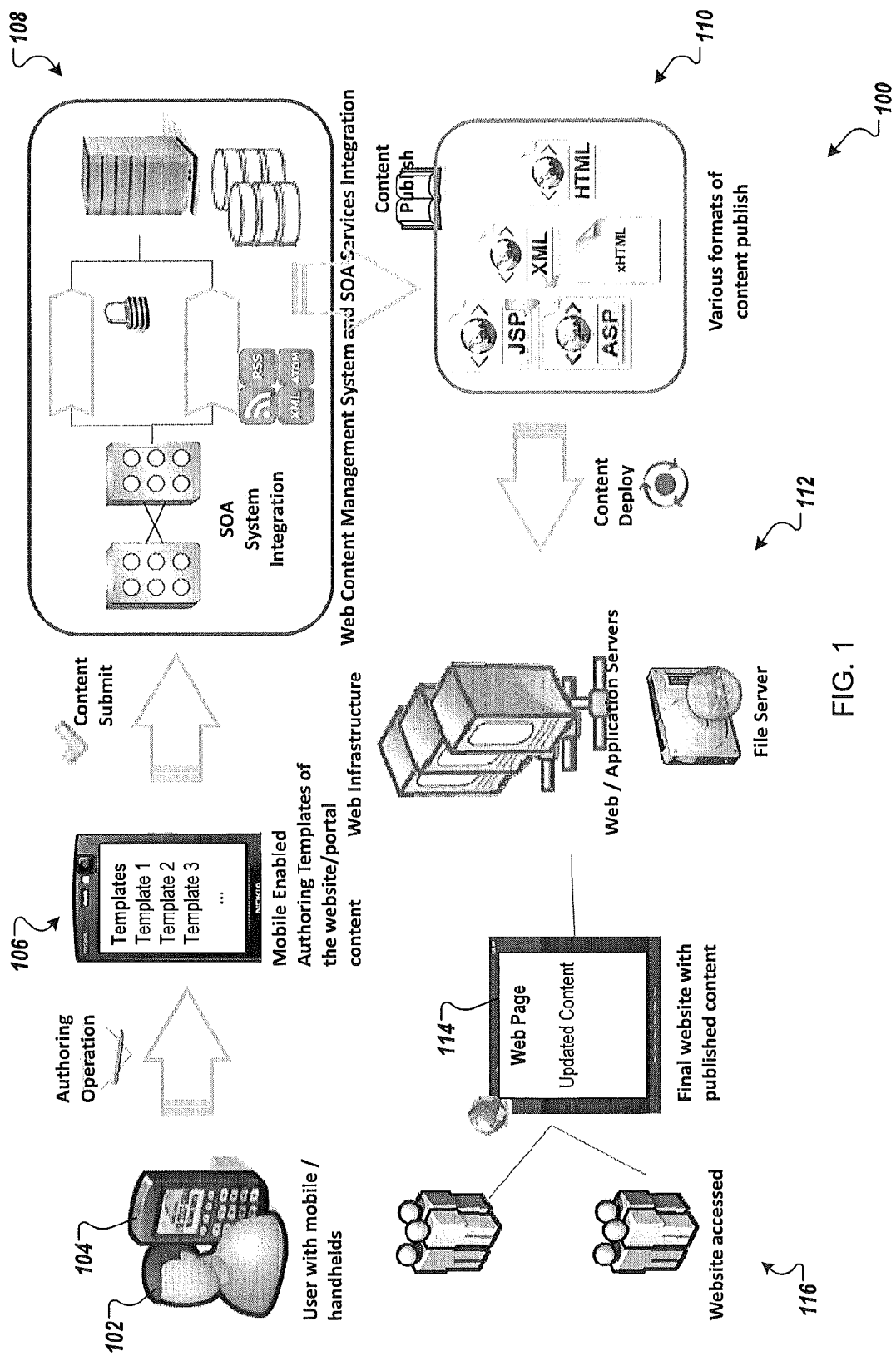
FIGS. 1, 2A, 2B, 3, 4, and 9 are diagrams of exemplary systems.

FIG. 1 illustrates an exemplary system 100 for authoring and deploying content. As part of an authoring operation, for example, a user 102 operates a mobile computing device 104. The mobile computing device 104 may be any appropriate type of computing device (e.g., mobile phone, smart phone, PDA, tablet computer, or other portable device) that includes one or more processors and computer readable media. Among other components, for example, the client device 102 includes one or more processors, computer readable media that store software applications, input devices (e.g., keyboards, touch screens, microphones, and the like), output devices (e.g., display screens, speakers, and the like), and communications interfaces.

By interacting with a user interface 106 provided by an application operating on the mobile computing device 104, for example, the user 102 can access a mobile authoring template for updating a web page. In some implementations, the user interface 106 may provide multiple templates, each template enabling the user 102 to update a different web page or a different portion of a single web page. For example, the user 102 may select a desired template and interact with interface controls configured to enable the user 102 to make updates to a web page associated with the selected template.

As part of a content submission process, for example, the user 102 can interact with the user interface 106 (e.g., a content submission control) to request that the application operating on the mobile computing device 104 provide input defining web page content updates to a content management system 108. In some implementations, input from mobile applications may be provided via a wireless Internet connection. In some implementations, input from mobile applications may be provided from users in locations in which a broadband internet connection is unavailable. For example, the input defining web page content updates provided by the application operating on the mobile computing device 104 can be provided via communication over one or more networks, including wireless cellular networks, wireless local area networks (WLAN), WiFi networks, Third Generation (3G) or Fourth Generation (4G) mobile telecommunication networks, other communication networks, or any appropriate combination thereof.

The content management system 108 includes at least one processor and at least one memory coupled to the processor(s) that includes instructions, which, when executed by the processor(s), cause the processor(s) to perform various operations. For example, the content management system 108 can provide integration services with various service-oriented architectures (SOA) associated with various content management systems (CMS). Based at least in part on stored configuration data related to the template selected by the user 102, for example, the content management system 108 invokes content management services to publish the received content update information to one or more web pages.

As part of a content publishing process, various formats 110 of content publishing can be used to format and publish content. For example, JavaServer Pages (JSP), Active Server Pages (ASP), HyperText Markup Language (HTML), Extensible Markup Language (XML), and eXtensible HyperText Markup Language (xHTML), and other appropriate content publishing formats can be used to format the received content update information.

As part of a content deployment process, formatted content can be provided to a web infrastructure 112. For example, the web infrastructure 112 (e.g., the Internet and/or an intranet) can include one or more web servers, application servers, and file servers for providing web pages associated with one or more web sites. In the present example, the web infrastructure 112 can provide a final website with published content, including a web page 114 that includes the content update made on the mobile computing device 104 by the user 102. Users 116 can access the web page 114 including the content update, for example, by operating client computing devices, such as mobile and stationary computers executing web browser applications.

Figure 2A:
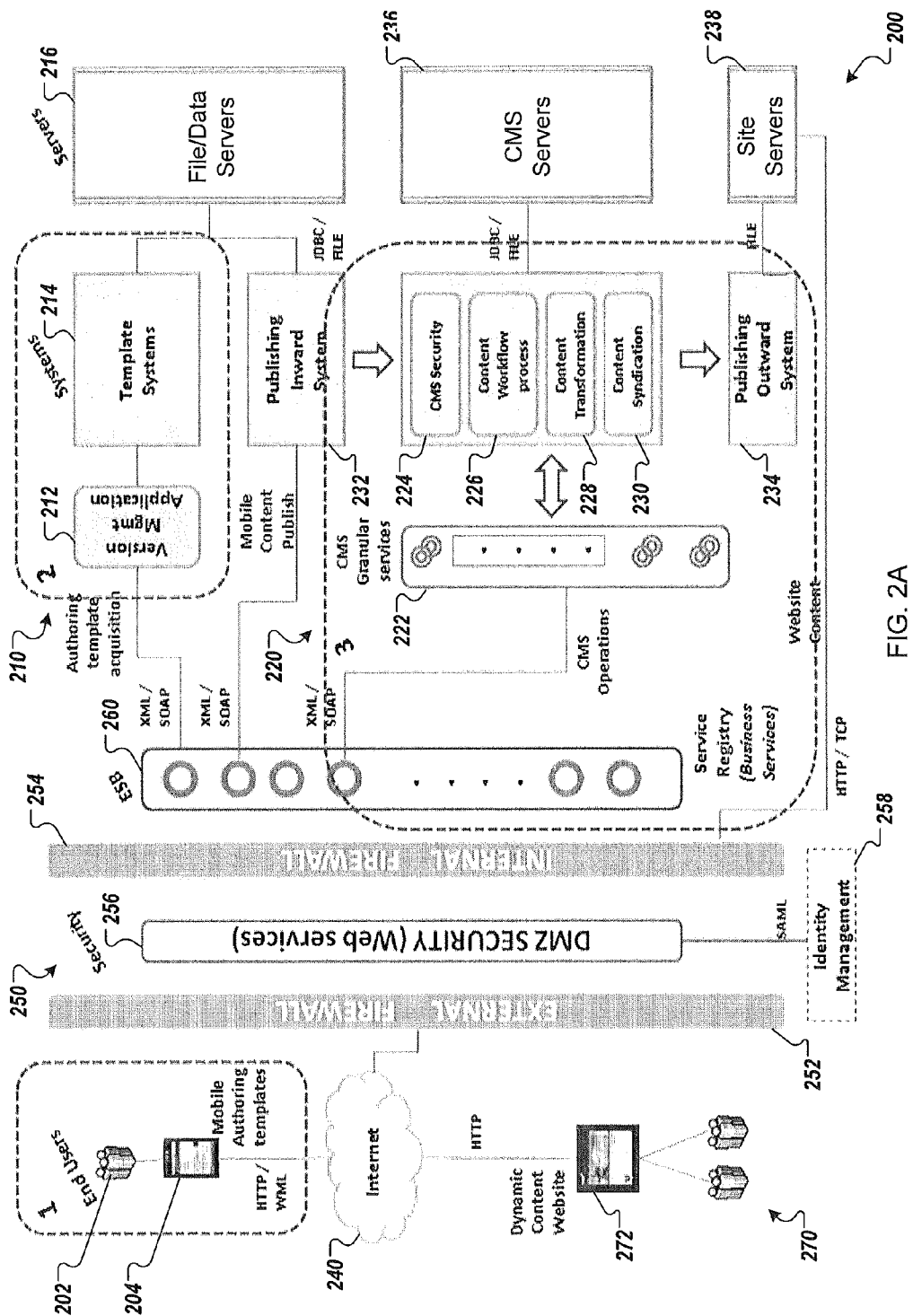

FIG. 2A illustrates an exemplary system 200 for authoring and deploying content. In general, the system 200 generates mobile authoring templates that include pre-defined interface controls that are configured to enable users to make updates to subsets of web pages using mobile devices. The system 200 associates unique identifiers with the generated mobile authoring templates, provides the templates to mobile device applications operating on the mobile devices, and stores configuration data in association with the unique identifiers. The configuration data can define operations needed to publish content updates received through the mobile authoring templates to web pages. The system 200 receives from the mobile device applications input defining content updates entered into the mobile authoring templates using the mobile devices. The input can include unique identifiers associated with the mobile authoring templates. In response to receiving the input defining content updates, the system 200 can assess configuration data based on the unique identifiers. Based on the configuration data, the system 200 can invoke content management services needed to publish the received content updates to web pages, and can publish content to the web pages to reflect the received content updates.

The system 200 can include one or more mobile computing devices 204 (e.g., similar to the mobile computing device 104, shown in FIG. 1) operated by one or more users 202. The mobile computing device 204, for example, may be pre-loaded with one or more mobile authoring templates and with an application that sends input defining content updates entered into the templates. The mobile authoring templates may be generated and provided to the mobile device application by an authoring template system 210.

The authoring template system 210 includes a version management application 212 and template management systems 214, each including at least one processor, and at least one memory coupled to the processor(s). The version management application 212 can handle authoring template acquisition by the user(s) 202, for example, by managing multiple template versions, and by providing user(s) 202 with appropriate versions.

The template systems 214 can generate mobile authoring templates. For example, a system user or administrator can identify a subset (e.g., a region of text, an image, a data element, a font, a style, etc.) of a particular web page to be updated, and the template systems 214 can generate an authoring template including pre-defined interface controls that are configured to enable users 202 to make updates to the subset using mobile computing devices 204. The template systems 214, for example, can also associate a unique identifier with the generated authoring template. In some implementations, associating the unique identifier with the generated mobile authoring template may include embedding the unique identifier in the authoring template. When content updates are received through mobile authoring templates, for example, embedded identifiers may enable template identification. The template systems 214 can access file/data servers 216 for storing and referencing generated authoring templates for use in further processing. In some implementations, generating mobile authoring templates may include generating multiple, different mobile authoring templates that each include pre-defined interface controls configured to enable users to make updates to subsets of web pages. For example, the multiple, different authoring templates can be generated for multiple, different types of content management systems and can enable updates to multiple, different web pages. Each of the multiple, different mobile authoring templates can be associated with a unique identifier, for example.

Configuration data can be stored in association with the unique identifier by a content management system 220 including at least one processor, and at least one memory coupled to the processor(s). For example, the configuration data may define operations needed to publish content updates received through mobile authoring templates to web pages. The content management system 220 can perform various processes and services, including one or more granular services 222, a security service 224, a content workflow process 226, a content transformation service 228, and a content syndication service 230. The content management system 220 can access content management system servers 236 for storing and referencing configuration data for use in further processing.

The content management system 220 can interface with additional systems, including a publishing inward system 232 and a publishing outward system 234, each including at least one processor, and at least one memory coupled to the processor(s). The publishing inward system 232, for example, may operate as a bridge between users 202 and the content management system 220 for publishing mobile content. As another example, the publishing inward system 232 may operate as a bridge between the authoring template system 210 and the content management system 220 for accessing mobile authoring template information. For example, mobile authoring template information (e.g., identifiers, interface control information, etc.) may be provided to the content management system 220 via the publishing inward system 232 and/or directly from the file/data servers 216.

In some implementations, storing configuration data may include receiving user input describing operations needed to publish content updates received through mobile authoring templates to web pages. For example, a system user or administrator can provide instructions for publishing content updates received through a particular template to a particular web page. In this example, a configuration wizard may guide the system user or administrator through the various pieces of information needed to publish content to the particular web page. As another example, a system user or administrator can provide instructions for publishing content updates received through a particular set of templates to a particular set of web pages. For example, the particular set of templates may be used for publishing content updates for web pages publishing using a particular content management system. Based on the received user input, for example, a configuration file may be generated that defines all of the operations needed to publish content updates received through the mobile authoring template to the web page(s). The configuration file can be stored in association with the unique identifier, for example, by the content management system servers 236, for use in further processing.

The generated mobile authoring template can be provided to a mobile application operating on a mobile device. For example, the user 202 can employ the mobile computing device 204 to access a network 240 (e.g., the Internet, or another appropriate network). To access the authoring template system 210, for example, the mobile application operating on the mobile computing device 204 can navigate a security network 250, including an external firewall 252, an internal firewall 254, and security web services 256 which leverage an identity management system 258. For example, the identity management system 258 may verify the identity of the user 202, based on identification credentials provided by the user (e.g., a password), credentials associated with the mobile computing device 204 (e.g., a media access control address), credentials associated with the mobile application (e.g., an application key), or another appropriate mechanism. Upon verifying the user, for example, mobile application data can be provided to the authoring template system 210 via an enterprise service bus 260. Based on provided identification credentials, for example, the version management application 212 can determine one or more mobile authoring templates to be provided to the mobile computing device. The template systems 214 can retrieve the appropriate template(s) from the file/data servers 216, for example, and the authoring template system 210 can provide the template(s) to the mobile computing device 204 via the enterprise service bus 260.

The user 202 can interact with a user interface presented by the mobile computing device 204, for example, to interact with one or more mobile authoring templates for updating web pages. For example, the user 202 can use a mobile device application executed by the computing device 204 to select a mobile authoring template for updating a particular web page, and to indicate one or more updates (e.g., text updates, image updates, data updates, font updates, style updates, etc.). The mobile application can provide update information to the publishing inward system 232, for example, via the network 240 and the enterprise serial bus 260. The publishing inward system 232 can reference mobile authoring template information via the template systems 214 and/or the file/data servers 216, for example, and can provide template and/or update information to the content management system 220.

The content management system 220 can receive input defining a content update entered into the generated mobile authoring template using the mobile computing device 204. For example, the input can include content update information and can include the unique identifier associated with the selected mobile authoring template. In some implementations, receiving input from the mobile device application may include receiving a version of the generated mobile authoring template that includes a content update entered using the mobile device and that has the unique identifier embedded within the template. In some implementations, receiving input from the mobile device application may include receiving input defining a content update made using one of multiple, different mobile application templates selected by a user in accordance with which of the multiple, different web pages the user desires to update. For example, the user 202 may manage multiple web pages, such as a web page for presenting contact information, a web page for presenting product photos, and a web page for presenting sales statistics. In the present example, the user 202 may use the mobile device application executed by the mobile computing device 204 to select a mobile authoring template associated with the web page for presenting sales statistics, and may use the template to make updates (e.g., changing sales statistics for a particular product) to a subset of the webpage.

In some implementations, in response to receiving the input defining the content update, an identity of the user attempting to make the content update may be determined. For example, the content management system 220 can access the security service 224 to determine the identity of the user 202, and the security service 224 can determine whether the user attempting to make the content update is authorized to make the update. If the security service 224 determines that the user 202 is authorized, for example, the content management system 220 can process the update. If the security service 224 determines that the user 202 is not authorized, for example, the content management system 220 can generate an error condition and prevent the update. Thus, in some implementations, multiple levels (e.g., identity management, content management) of security may be used to maintain system security.

In some implementations, in response to receiving the input defining the content update, the update may be placed in a queue until content management services are available to process the update. For example, the content management system 220 can provide the content update received from the mobile device application operated by the user 202 to the content workflow process 226, which may maintain a queue of content updates received from various mobile device applications operated by various users. As resources become available for further content update processing, for example, the content workflow process 226 can manage content updates from the queue.

In response to receiving input defining content updates, configuration data can be accessed based on unique identifiers. For example, the content management system 220 can provide the unique identifier associated with the mobile application template employed by the user 202 to the content management system servers 236 to access configuration data associated with the template. In some implementations, accessing configuration data based on the unique identifier may include extracting the unique identifier embedded in a received version of a generated mobile authoring template that includes a content update, identifying configuration data for the extracted identifier, and retrieving the identified configuration data. For example, content management system 220 can extract the unique identifier embedded in a mobile authoring template including one or more content updates received from the mobile device application operated by the user 202.

In some implementations, accessing configuration data based on the unique identifier may include searching configuration files for the configuration file associated with the unique identifier. For example, the content management system servers 236 may store multiple configuration files, each associated with a unique identifier. The content management system 220 and/or the content management system servers 236 can identify the configuration file associated with the unique identifier based on the searching, and can retrieve, from electronic storage, the configuration file associated with the unique identifier.

In some implementations, accessing configuration data based on the unique identifier may include accessing configuration data for the unique identifier associated with the mobile authoring template selected by the user. For example, the mobile device application operated by the user 202 using the mobile computing device 204 may include multiple, different, mobile authoring templates, each associated with a unique identifier. In the present example, the content management system 220 can access configuration data associated with the template selected by the user 202.

Based on the configuration data, content management services needed to publish the received content to the web page can be invoked. For example, the content management system 220 can access the granular services 222, the security service 224, the content transformation service 228, the content syndication service 230, and/or the publishing outward system 234 to invoke such services. In some implementations, invoking content management services may include invoking content management services defined within a retrieved configuration file. For example, the configuration file retrieved from the content management servers 236 may include information associated with one or more services for publishing content, such as formatting information, application programming interface (API) calls, validation rules, business rules, and the like.

In some implementations, invoking content management services may include converting the content update into a proper format and structure for integration into the web page. For example, the content management system 220 can access the content transformation service 228 to convert the content update to one or more appropriate formats (e.g., JSP, ASP, HTML, XML, xHTML, etc.) for web page integration.

In some implementations, invoking content management services may include validating that the content update includes appropriate information for the content update, and transforming the content update into a form appropriate for incorporation into the web page. For example, the content management system 220 can reference and apply validation and/or business rules included in the configuration file retrieved from the content management servers 236, and the content transformation service 228 can apply formatting information included in the file to transform the content update.

In some implementations, invoking content management services may include invoking an authorization service to confirm authorization to publish the content update. For example, the content management system 220 can invoke the security service 224 to verify that the user 202 is authorized to update a web page (e.g., the web page for presenting sales statistics) using a mobile authoring template.

In some implementations, invoking content management services may include invoking a syndication service. For example, the content management system 220 can invoke the content syndication service 230 for presenting content in various formats for various purposes. For example, the syndication service 230 can provide the content update to various online platforms for presentation.

In some implementations, invoking content management services may include determining whether a content management system supporting the web page requires synchronous or asynchronous transactions. For example, the content management system 220 can interact (e.g., send and receive messages) with other content management systems by invoking the granular services 222. Various other content management systems may be used to support web pages associated with content updates, and may have varying protocols and application programming interfaces for handling the updates. For example, in response to a determination that another content management system supporting the web page requires synchronous transactions, content may be published using a synchronous transaction. As another example, in response to a determination that another content management system supporting the web page requires asynchronous transactions, content may be published using an asynchronous transaction.

In some implementations, the system 200 may be configured to add connectors to support content delivery channels, and content may be published to content delivery channels using the connectors. For example, content management system operations may be defined for multiple other content management systems, and the granular services 222 can be modified to connect to the other content management systems, based at least in part on the defined operations. If a system user or administrator desires to connect with a new content management system, a new connector to support a new content delivery channel can be added to the system 200, for example, by extending the granular services 222.

Content can be published to the web page to reflect the received content update made on the mobile device (e.g., the mobile device 204) using the generated mobile authoring template. For example, the content management system 220 can access the publishing outward system 234 to publish content to one or more of the site servers 238. Users 270 can access a dynamic content website 272 including the web page for presenting the content update, for example, by operating client computing devices, such as mobile and stationary computers executing web browser applications.

In some implementations, the system 200 includes multiple, different connectors that enable the system to connect with multiple, different types of content management systems. Publishing content to the web page to reflect the received content update made on the mobile computing device 204 using the mobile authoring template may include selecting, from among the multiple, different connectors, a connector for a content management system that manages content included on the web page. For example, content included on a particular web page (e.g., the web page for presenting sales statistics) to be updated by the user 202 may be managed by a particular content management system. The system 200, for example, can select a connector for the particular content management system (e.g., by accessing a particular one of the granular services 222), and can use the selected connector to transfer the received content update to the particular content management system that manages content included on the particular web page. The connectors may be reused by many users for many authoring templates.

In some implementations, publishing content to the web page may include determining publishing activities needed to publish the transformed content update into the web page, and publishing the transformed content update into the web page using the determined publishing activities. For example, the publishing outward system 234 can determine such publishing activities. In some implementations, determining publishing activities may include determining, from among multiple, possible destination devices (e.g., a database, file server, etc.), a destination device for publishing the transformed content update into the web page. For example, the publishing outward system 234 can determine from multiple site servers 238, one or more servers for publishing the content. Publishing the transformed content update into the web page may include, for example, publishing the transformed content to the determined destination device(s) (e.g., one or more web site servers).

In some implementations, publishing content to the web page may include integrating the received content update made on the mobile device (e.g., the mobile device 204) using the mobile authoring template into other enterprise content included in the web page. For example, the web page for presenting sales statistics may include additional content, such as graphics, web links, and descriptive text. Thus, for example, static and dynamic content may be included on the same web page, and dynamic content may be updated by users through the use of mobile authoring templates.

Although the example shown in FIG. 2A shows the authoring template system 210, the content management system 220, the publishing inward system 232, and the publishing outward system 234 as separate systems, other examples may be used. For example, one or more of the systems 210, 220, 232, and/or 234 may be integrated.

Figure 2B:
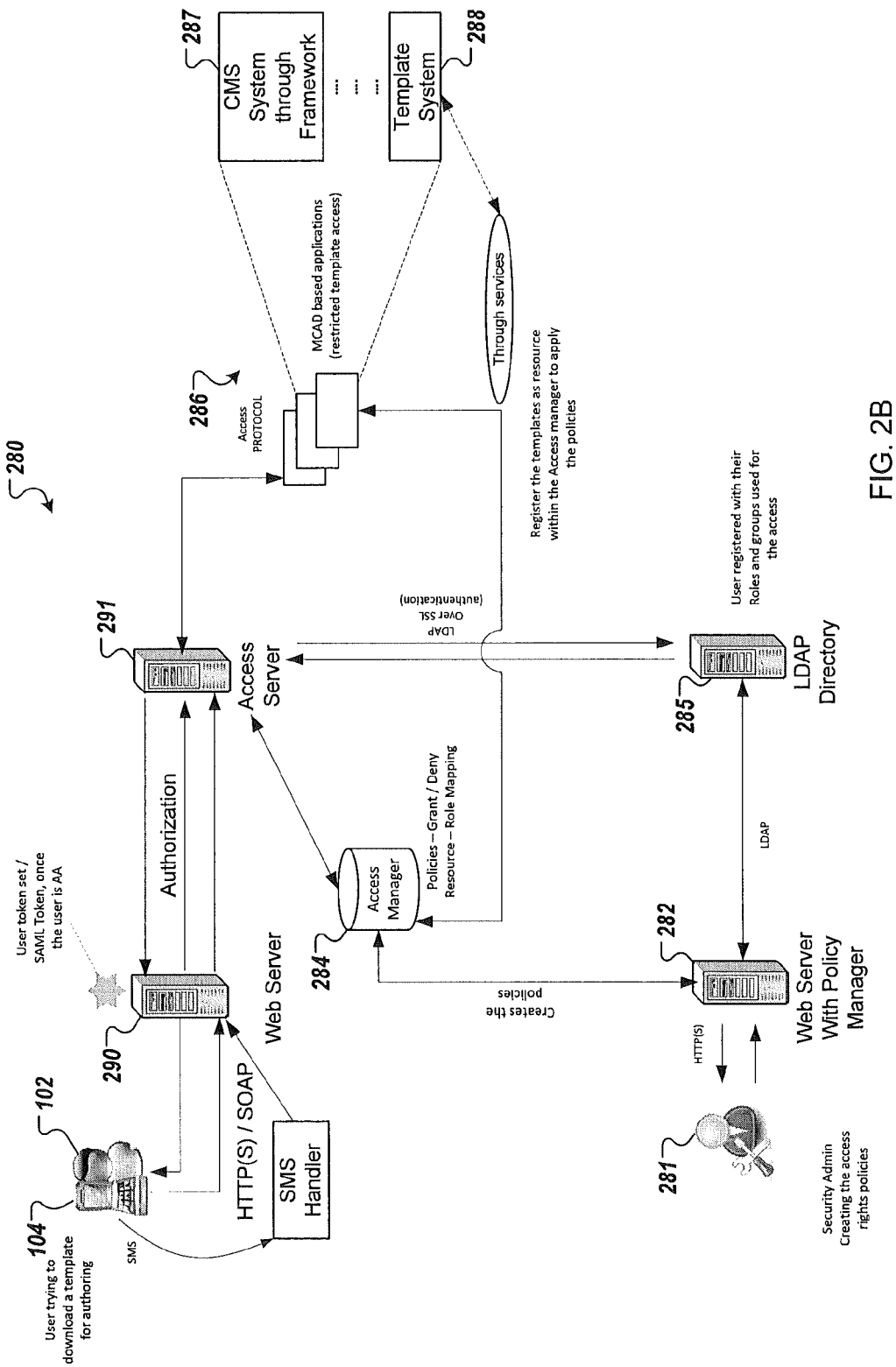

FIG. 2B illustrates an exemplary system 280 for controlling user access to the system 100, 200 for authoring and deploying content. In general, the system 280 can include components described with respect to system 100, 200 of FIGS. 1 and 2. For example, the system 280 may include or perform functions of the security network 250, the security service 224, and/or the identity management system 258 (shown in FIG. 2A). In general, one or more security administrators can use the system 280 to create and enforce access rights policies for one or more users for providing mobile authoring templates to users and for applying content updates made by users on mobile devices using the templates.

In the present example, a security administrator 281 can create access rights policies. For example, the security administrator 281 can use an interface (e.g., a web browser) presented by a client computing device to access a policy manager server 282 (e.g., a web server) to create access rights policies applicable to the user 102. The policy manager server 282 may communicate with an access manager 284 and a directory server 285, for example, providing access rights policy information determined by the security administrator 281 to each. The access manager 284, for example, can store and manage security policy information (e.g., granting and denying privileges) and resource information (e.g., role mapping) for users. The directory server 285, for example, can store and manage information associated with access roles and groups for users.

Based on information stored and provided by the access manager 284, for example, various mobile authoring templates can be registered to apply policies. For example, the access manger 284 can receive mobile authoring template information from a mobile content authoring and deployment system 286 including a content management system 287 (e.g., similar to the content management system 222, shown in FIG. 2A) and a template system 288 (e.g., similar to the authoring template system 210, also shown in FIG. 2A). In some implementations, mobile authoring template information may be retrieved via services. By registering the user 102 with the access manager 284 and/or the directory server 285, for example, the user 102 may access the system 280, may receive mobile authoring templates from the system 280, and may provide content updates to the system 280.

In the present example, the user 102 downloads one or more mobile authoring templates. For example, the user 102 may employ the mobile computing device 104 to access a web gate 290 (e.g., a web server) using one or more protocols, such as HyperText Transfer Protocol Secure (HTTPS), Simple Object Access Protocol (SOAP), and Short Message Service (SMS), and other appropriate protocols. One or more identification credentials (e.g., passwords, identifiers, codes, keys, etc.) may be provided by the user 102 and/or the mobile computing device 104 to the web gate 290. In some implementations, identification credentials may include one-time security details. For example, new users may provide such details to gain initial access to the system 280.

In the present example, the web gate 290 can provide identification credentials of the user 102 to an access server 291, and based on the provided details, the user 102 may be authenticated via the access manager 284 and/or the directory server 285. If the user 102 is identified as a new user, for example, the access server 291 may register the user 102 with the directory server 285. If the user 102 is as an existing user, for example, the directory server 285 may authenticate the user 102.

In the present example, role and group information can be associated with one or more mobile authoring template identifiers and can be provided to the access server 291 for authorization. For example, the access server 291 can receive policy and resource information from the access manager 284 and can determine whether the user 102 is authorized to access the requested mobile authoring template(s) based on such information. In some implementations, a token may be set at the web gate 290 to facilitate future user access to the system 280.

If access to the requested mobile authoring template(s) is granted for the user 102, for example, the template(s) can be provided to the user. For example, the access server 291 can retrieve the template(s) from the mobile content authoring and deployment system 286 via an access protocol, and can provide the template(s) to the mobile computing device 104 via the web gate 290.

Figure 3:
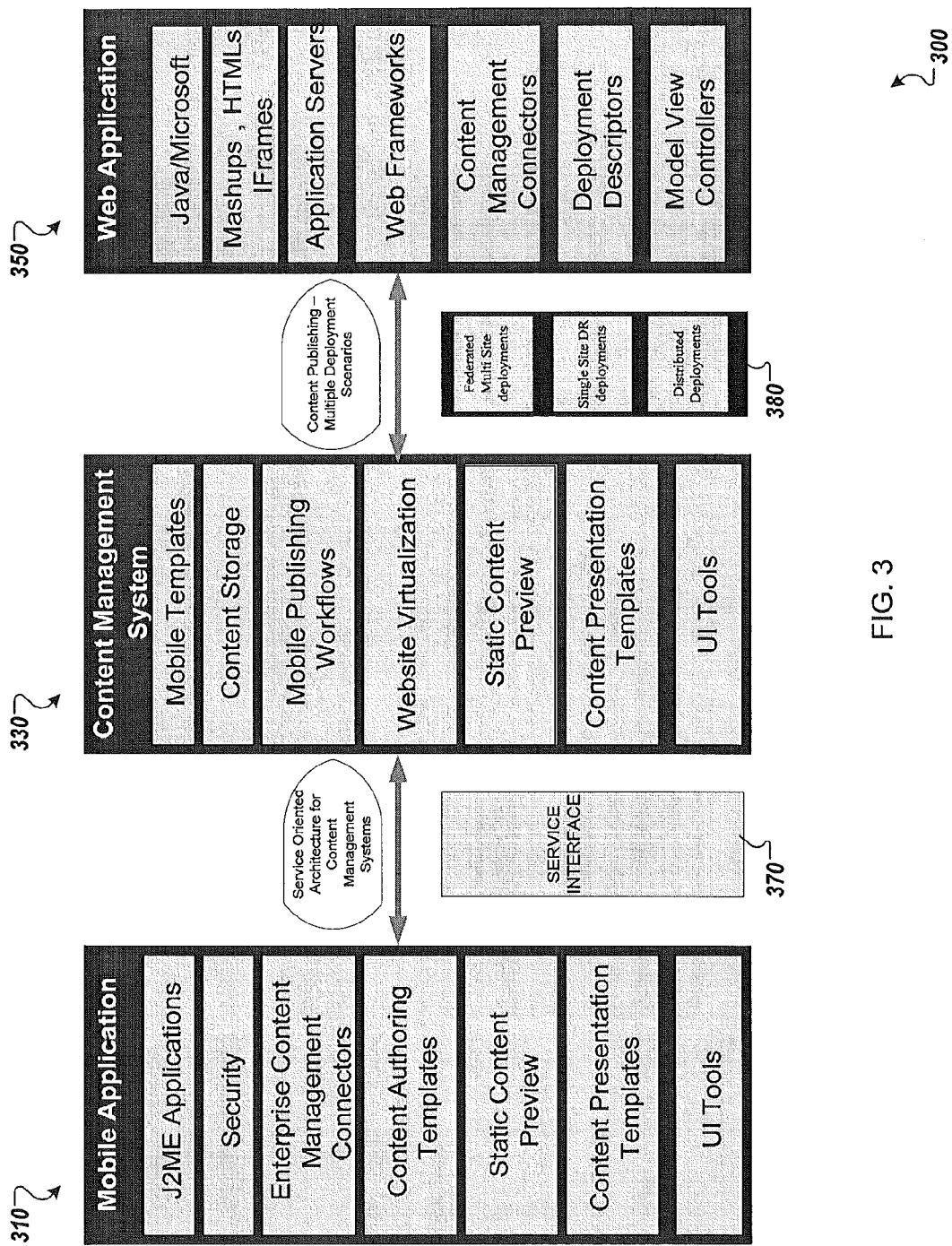

FIG. 3 illustrates an exemplary system for authoring and deploying content. The system includes a mobile application 310, a content management system 330, and a web application 350, each including at least one processor and at least one memory coupled to the processor(s).

The mobile application 310 can communicate with the content management system 300 via a service interface 370. For example, the service interface 370 can include a service-oriented architecture for content management systems. The content management system 330 can communicate with the web application using a content publishing interface 380. For example, the content publishing interface 380 can include multiple deployment scenarios including federated multi-site deployments, single site deployments, and distributed deployments.

The mobile application 310 can include multiple components, including J2ME applications, security components, enterprise content management connectors, content authoring templates, static content preview components, content presentation templates, and UI tools. The content management system 330 can include multiple components, including mobile templates, content storage components, mobile publishing workflows, website virtualization, static content preview, content presentation templates, and UI tools. The web application 350 can include multiple components, including language interfaces (e.g., Java, Microsoft), web presentation components (e.g., mashups, HTML, IFrames, etc.), application servers, web frameworks, content management connectors, deployment descriptors, and model view controllers.

Figure 4:
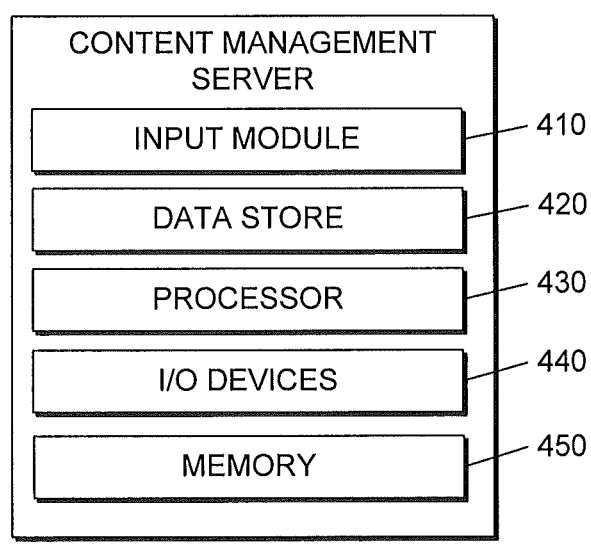

FIG. 4 illustrates an exemplary content management server system 400. The system 400 includes an input module 410, a data store 420, one or more processors 430, one or more I/O (Input/Output) devices 440, and memory 450. The input module 420 may be used to input any type of information related to managing content on the system 400. For example, the input module 410 may be used to receive input defining a content update entered into a mobile authoring template. In some implementations, data from the input module 410 is stored in the data store 420. The data included in the data store 420 may include, for example, generated mobile authoring templates, configuration data defining operations needed to publish content updates received through mobile authoring templates, configuration files, information associated with connectors for content management systems, and information associated with destination devices for publishing content.

In some examples, the data store 420 may be a relational database that logically organizes data into a series of database tables. Each database table in the data store 420 may arrange data in a series of columns (where each column represents an attribute of the data stored in the database) and rows (where each row represents attribute values). In some implementations, the data store 420 may be an object-oriented database that logically or physically organizes data into a series of objects. Each object may be associated with a series of attribute values. In some examples, the data store 420 may be a type of database management system that is not necessarily a relational or object-oriented database. For example, a series of XML (Extensible Mark-up Language) files or documents may be used, where each XML file or document includes attributes and attribute values. Data included in the data store 420 may be identified by a unique identifier such that data related to a particular process may be retrieved from the data store 420.

The processor 430 may be a processor suitable for the execution of a computer program such as a general or special purpose microprocessor, and any one or more processors of any kind of digital computer. In some implementations, the system 400 includes more than one processor 430. The processor 430 may receive instructions and data from the memory 450. The memory 450 may store instructions and data corresponding to any or all of the components of the system 400. The memory 450 may include read-only memory, random-access memory, or both.

The I/O devices 440 are configured to provide input to and output from the system 400. For example, the I/O devices 440 may include a mouse, a keyboard, a stylus, or any other device that allows the input of data. The I/O devices 440 may also include a display, a printer, or any other device that outputs data.

Figure 5:
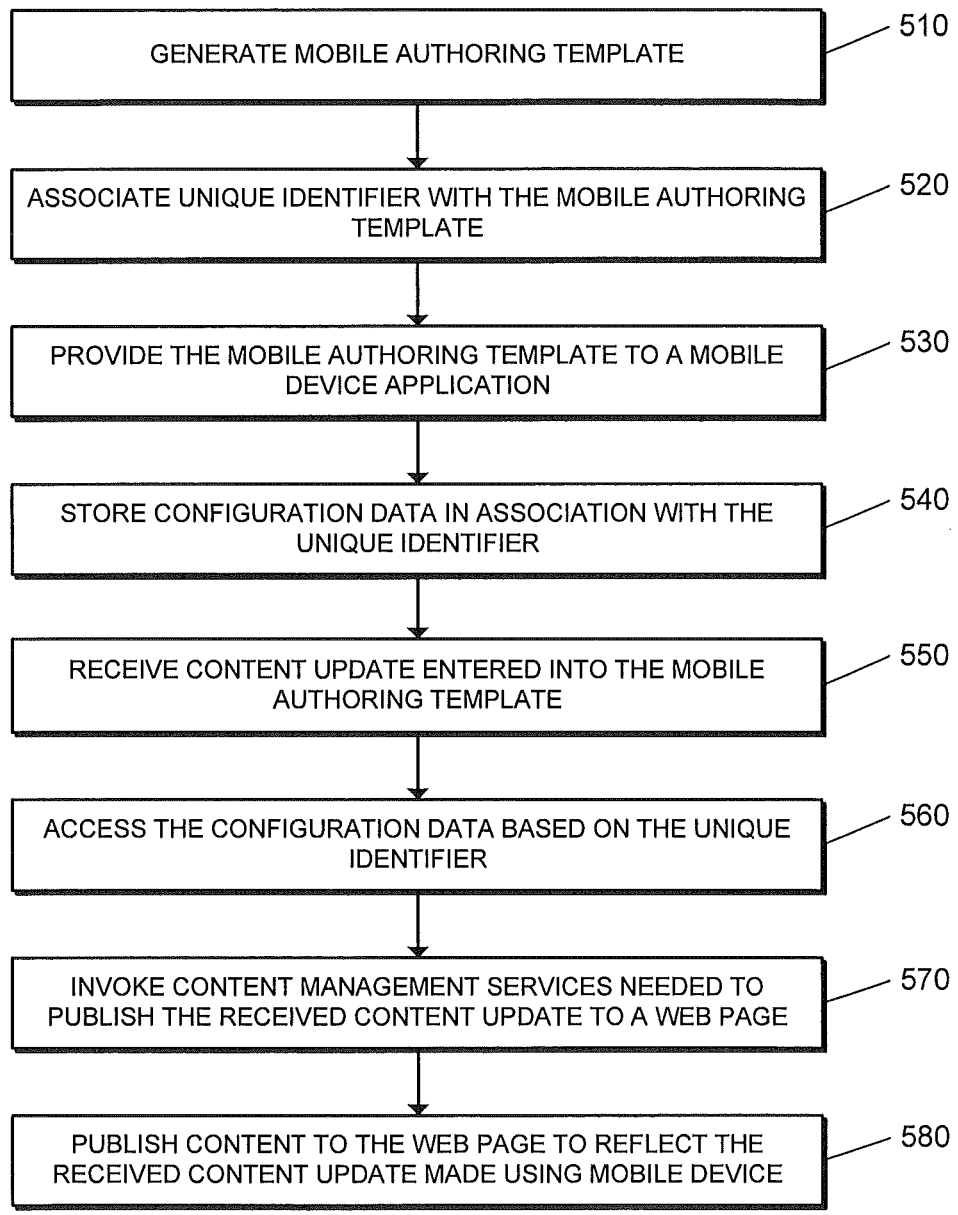
FIG. 5 is a flowchart of an exemplary process.

FIG. 5 illustrates a process 500 for authoring and publishing content. The operations of the process 500 are described generally as being performed by the content management server system 400. In some implementations, operations of the process 500 may be performed by one or more processors included in one or more electronic devices.

The system 400 generates a mobile authoring template (510). For example, the mobile authoring template may include pre-defined interface controls that are configured to enable a user to make updates to a subset of a web page using a mobile device.

The system 400 associates a unique identifier with the mobile authoring template (520). For example, associating the unique identifier with the mobile authoring template may include embedding the unique identifier in the generated mobile authoring template.

The system 400 provides the mobile authoring template to a mobile device application (530). For example, the mobile authoring template may be sent to a mobile device application resident on a mobile device and the mobile device application may be executed by the mobile device to display and enable user interaction with the mobile authoring template.

The system 400 stores configuration data in association with the unique identifier (540). For example, the configuration data may be stored in a data store (e.g., the data store 420 described above with respect to FIG. 4). The configuration data, for example, may define operations needed to publish content updates received through the mobile authoring template to the web page.

The system 400 receives input defining a content update entered into the mobile authoring template (550). For example, the input defining the content update may be received from the mobile device application by an input module (e.g., the input module 410 described above with respect to FIG. 4). The input, for example, may include the unique identifier associated with the generated mobile authoring template. In some implementations, the system 400 may receive a version of the mobile authoring template that includes a content update entered using the mobile device and that has the unique identifier embedded within the template.

In response to receiving the input defining the content update, the system 400 accesses the configuration data based on the unique identifier (560). In some implementations, accessing the configuration data may include extracting the unique identifier embedded in the received version of the generated mobile authoring template that includes the content update, identifying configuration data for the extracted identifier, and retrieving the identified configuration data.

Based on the configuration data, the system 400 invokes content management services needed to publish the received content update to a web page (570). For example, invoking content management services may include converting the content update into a proper format and structure for integration into the web page. In some implementations, invoking content management services may include validating that the content update includes appropriate information for the content update, and transforming the content update into a form appropriate for incorporation into the webpage.

The system 400 publishes content to the web page to reflect the received content update made using the mobile device (580). For example, the generated mobile authoring template may be used in the publishing process. In some implementations, publishing content to the web page to reflect the received content update made on the mobile device using the generated mobile authoring template may include determining publishing activities needed to publish a transformed content update into the web page, and publishing the transformed content update into the web page using the determined publishing activities. For example, determining publishing activities may include determining, from multiple, possible, destination devices, a destination device for publishing the transformed content update into the web page. The destination devices, for example, may include one or more databases and one or more file servers. Publishing the transformed content update into the web page using the determined publishing activities may include publishing the transformed content update to the determined destination device.

Figure 6:
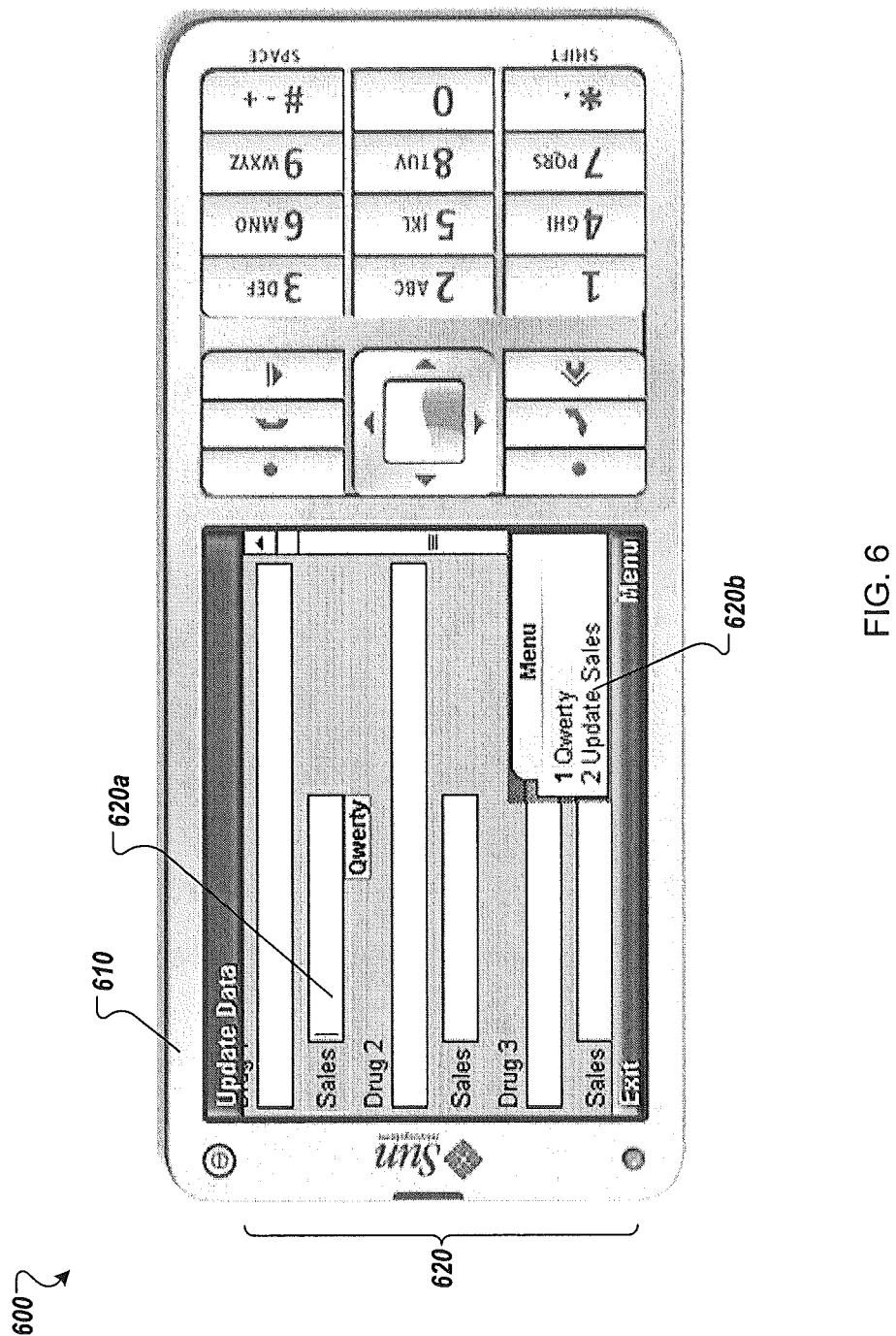
FIGS. 6, 7, and 8 are diagrams illustrating exemplary user interfaces.

FIG. 6 illustrates an exemplary user interface 600 for enabling users to make updates to a subset of a web page using a mobile device 610. For example, the interface 600 may be based on a mobile authoring template generated by a system such as the authoring template system 210 (shown in FIG. 2A). The mobile authoring template can be provided to a mobile device application operating on the mobile device 610.

The user interface 600 includes pre-defined interface controls 620 configured to enable a user to make content updates to a subset of a web page using the mobile device 610. For example, the user may interact with pre-defined interface control 620a to update sales information for a particular pharmaceutical. Upon providing information for one or more drugs, for example, the user can interact with a selection control 620b to indicate intent to provide the content update to a content management system such as the content management system 220 (also shown in FIG. 2A).

Figure 7:
Figure 8:
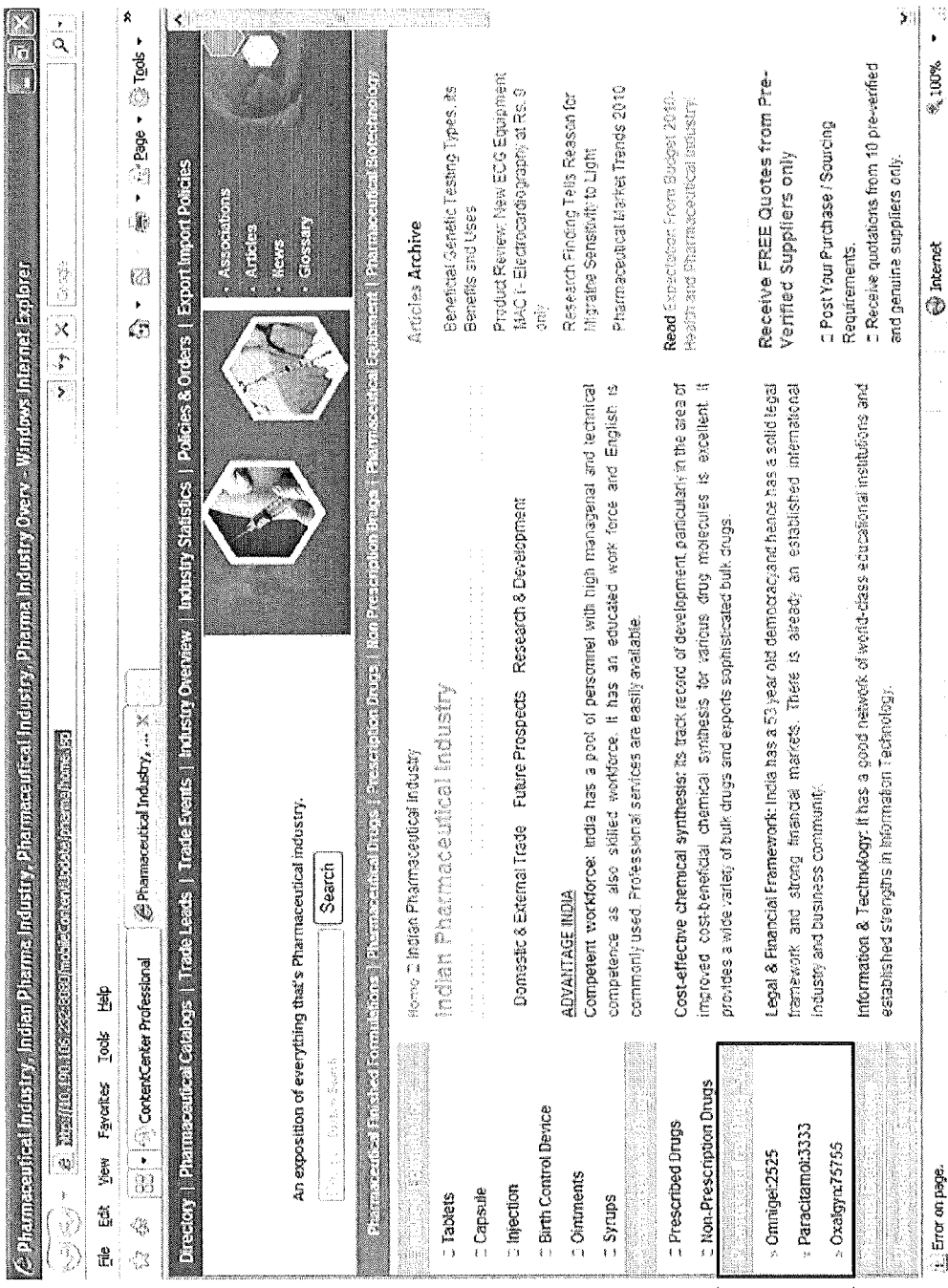

FIGS. 7 and 8 illustrate exemplary user interfaces 700, 800 for presenting web page content to reflect received content updates. For example, the interfaces 700, 800, can be presented to client computer device users within web browsers executed by the devices. In the present example, the interface 700 represents a web page before publishing a content update received from a mobile device (e.g., the mobile computing device 204, shown in FIG. 2A; the mobile device 610, shown in FIG. 6) and the interface 800 represents the web page after publishing the content update.

Referring to FIG. 7, for example, the web page includes a subset 710. The subset 710 in the present example includes a region of text associated with sales information for various pharmaceuticals. A mobile authoring template that includes pre-defined interface controls that are configured to enable a user to make updates to the subset 710 can be provided to the user's mobile device. The user can interact with the interface controls to indicate desired content updates, such as modifying the sales information.

Referring to FIG. 8, for example, the web page includes the subset 810 reflecting received content updates. For example, a content management system, such as the content management system 220 (shown in FIG. 2A), can publish received content updates to the web page. The received content updates can be integrated into other enterprise content included in the web page, such as graphics, web links, and descriptive text.

Figure 9:
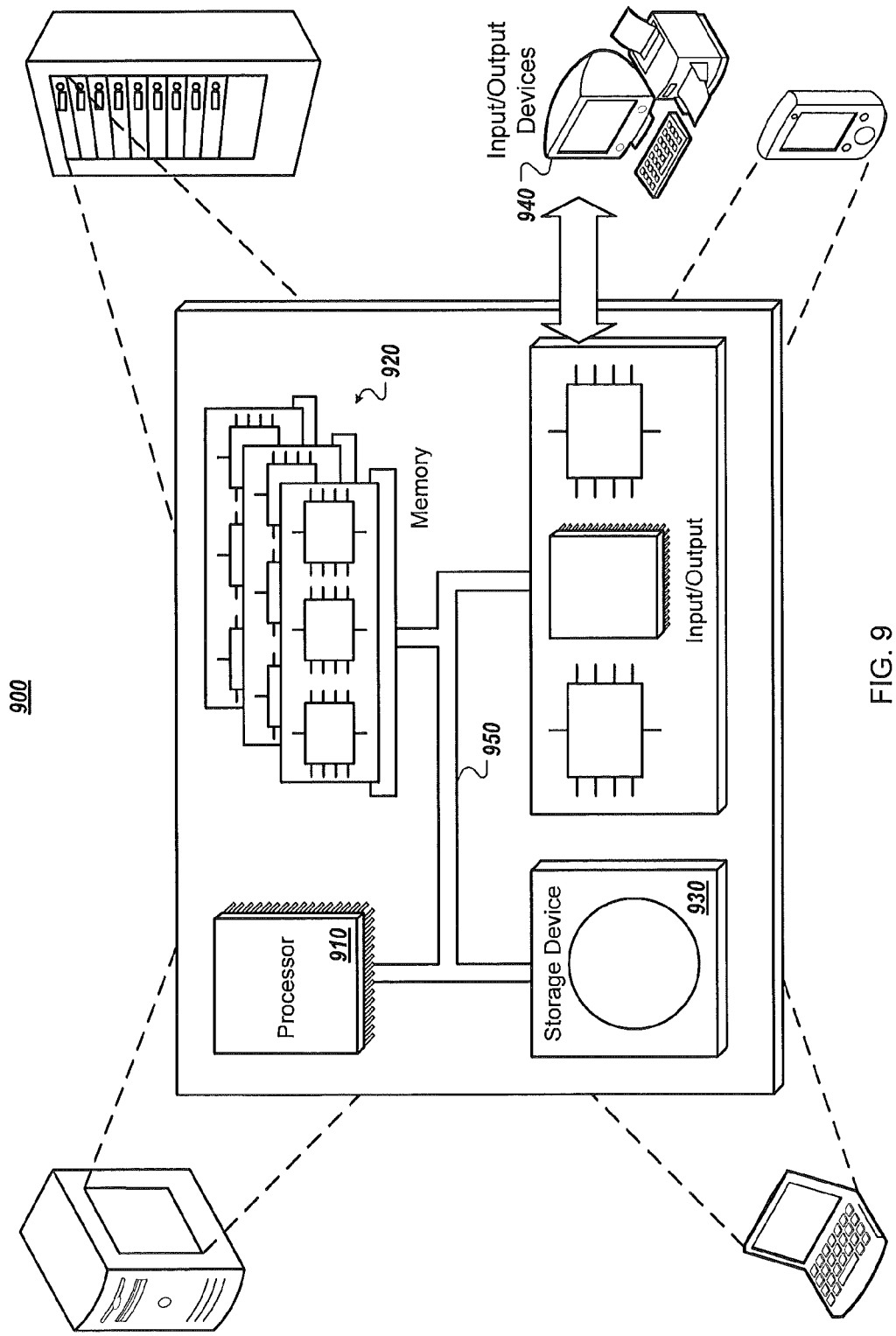

FIG. 9 is a schematic diagram of an example of a generic computer system 900. The system 900 can be used for the operations described in association with the process 500, according to one implementation. For example, the system 900 may be included in the systems 100, 200, 300, and 400.

The system 900 includes a processor 910, a memory 920, a storage device 930, and an input/output device 940. Each of the components 910, 920, 930, and 940 are interconnected using a system bus 950. The processor 910 is capable of processing instructions for execution within the system 900. In one implementation, the processor 910 is a single-threaded processor. In another implementation, the processor 910 is a multi-threaded processor. The processor 910 is capable of processing instructions stored in the memory 920 or on the storage device 930 to display graphical information for a user interface on the input/output device 940.

The memory 920 stores information within the system 900. In one implementation, the memory 920 is a computer-readable medium. In one implementation, the memory 920 is a volatile memory unit. In another implementation, the memory 920 is a non-volatile memory unit.

The storage device 930 is capable of providing mass storage for the system 900. In one implementation, the storage device 930 is a computer-readable medium. In various different implementations, the storage device 930 may be a floppy disk device, a hard disk device, an optical disk device, or a tape device.

The input/output device 940 provides input/output operations for the system 900. In one implementation, the input/output device 940 includes a keyboard and/or pointing device. In another implementation, the input/output device 940 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

What is claimed is:
1. A method comprising:
generating a mobile authoring template that includes predefined interface controls that are configured to enable a user to make updates to a subset of a web page using a mobile device;
associating a unique identifier with the generated mobile authoring template;
providing the generated mobile authoring template to a mobile device application operating on a mobile device;
storing configuration data in association with the unique identifier, the configuration data defining operations needed to publish content updates received through the generated mobile authoring template to the web page, by:
receiving user input describing operations needed to publish content updates received through the generated mobile authoring template to the web page,
based on the received user input, generating a configuration file that defines all of the operations needed to publish content updates received through the generated mobile authoring template to the web page, and
storing, in electronic storage, the configuration file in association with the unique identifier;
receiving, from the mobile device application, input defining a content update entered into the generated mobile authoring template using the mobile device, the input including the unique identifier associated with the generated mobile authoring template;
in response to receiving the input defining the content update, accessing the configuration data based on the unique identifier by:

searching configuration files for the configuration file associated with the unique identifier;
identifying the configuration file associated with the unique identifier based on the searching; and
retrieving, from the electronic storage, the configuration file associated with the unique identifier;
based on the configuration data, invoking content management services needed to publish the received content update to the web page by:
invoking content management services defined within the retrieved configuration file; and
publishing content to the web page to reflect the received content update made on the mobile device using the generated mobile authoring template.

2. At least one non-transitory computer-readable storage medium encoded with executable instructions that, when executed by at least one processor, cause the at least one processor to perform operations comprising:
generating multiple, different mobile authoring templates that each includes pre-defined interface controls that are configured to enable a user to make updates to a subset of a web page using a mobile device, the multiple, different mobile authoring templates being generated for multiple, different types of content management systems and enable updates to multiple, different web pages;
associating a unique identifier with each of the multiple, different mobile authoring templates;
providing some of the multiple, different mobile authoring templates to a mobile device application operating on a mobile device of a user;
storing, for each of the multiple, different mobile authoring templates, configuration data in association with the respective unique identifier, the configuration data defining operations needed to publish content updates received through the mobile authoring template to the web page;
receiving, from the mobile device application, input defining a content update made using one of the multiple, different mobile authoring templates selected by the user in accordance with which of the subsets of the multiple, different web pages the user desires to update, the input including the respective unique identifier associated with the one of the multiple, different mobile authoring templates;
in response to receiving the input defining the content update, accessing the configuration data for the respective unique identifier associated with the one of the multiple, different mobile authoring templates selected by the user;
based on the configuration data for the respective unique identifier, invoking content management services needed to publish the received content update to the subset of the web page the user desires to update; and
publishing content to the web page for the subset of the webpage the user desires to update to reflect the received content update made on the mobile device using the one of the multiple, different mobile authoring templates.

3. A system comprising:
at least one processor; and
at least one memory coupled to the at least one processor having stored thereon instructions which, when executed by the at least one processor, causes the at least one processor to perform operations comprising:
generating multiple, different mobile authoring templates that each includes pre-defined interface controls that are configured to enable a user to make updates to a subset of a web page using a mobile device, the multiple, different mobile authoring templates being generated for multiple, different types of content management systems and enable updates to multiple, different web pages;
associating a unique identifier with each of the multiple, different mobile authoring templates;
providing some of the multiple, different mobile authoring templates to a mobile device application operating on a mobile device of a user;
storing, for each of the multiple, different mobile authoring templates, configuration data in association with the respective unique identifier, the configuration data defining operations needed to publish content updates received through the mobile authoring template to the web page;
receiving, from the mobile device application, input defining a content update made using one of the multiple, different mobile authoring templates selected by the user in accordance with which of the subsets of the multiple, different web pages the user desires to update, the input including the respective unique identifier associated with the one of the multiple, different mobile authoring templates;
in response to receiving the input defining the content update, accessing the configuration data for the respective unique identifier associated with the one of the multiple, different mobile authoring templates selected by the user;
based on the configuration data for the respective unique identifier, invoking content management services needed to publish the received content update to the subset of the web page the user desires to update; and
publishing content to the web page for the subset of the webpage the user desires to update to reflect the received content update made on the mobile device using the one of the multiple, different mobile authoring templates.

4. The computer-readable storage medium of claim 3 wherein:
storing configuration data in association with the unique identifier, the configuration data defining operations needed to publish content updates received through the generated mobile authoring template to the web page, comprises:
receiving user input describing operations needed to publish content updates received through the generated mobile authoring template to the web page,
based on the received user input, generating a configuration file that defines all of the operations needed to publish content updates received through the generated mobile authoring template to the web page, and
storing, in electronic storage, the configuration file in association with the unique identifier;
in response to receiving the input defining the content update, accessing the configuration data based on the unique identifier comprises:
searching configuration files for the configuration file associated with the unique identifier;
identifying the configuration file associated with the unique identifier based on the searching; and
retrieving, from the electronic storage, the configuration file associated with the unique identifier; and
based on the configuration data, invoking content management services needed to publish the received content update to the web page comprises invoking content management services defined within the retrieved configuration file.

5. The system of claim 3, wherein associating a unique identifier with each of the multiple, different mobile authoring templates comprises embedding, for each of the multiple, different mobile authoring templates, the respective unique identifier in the corresponding mobile authoring template to enable identification of the corresponding mobile authoring template when content updates are received through the corresponding mobile authoring template.

6. The system of claim 5:
wherein receiving, from the mobile device application, input defining a content update made using one of the multiple, different mobile authoring templates selected by the user in accordance with which of the subsets of the multiple, different web pages the user desires to update comprises receiving, from the mobile device application, a version of the one of the multiple, different mobile authoring templates that includes a content update entered using the mobile device and that has the unique identifier embedded therein; and
wherein accessing the configuration data for the respective unique identifier comprises:
extracting the respective unique identifier embedded in the received version of the one of the multiple, different mobile authoring templates that includes the content update,
identifying configuration data for the extracted identifier, and
retrieving the identified configuration data.

7. The system of claim 3:
wherein the system includes multiple, different connectors that enable the system to connect with multiple, different types of content management systems;
wherein publishing content to the web page for the subset of the webpage the user desires to update to reflect the received content update made on the mobile device using the one of the multiple, different mobile authoring templates comprises:
selecting, from among the multiple, different connectors, a connector for a content management system that manages content included on the web page, and
using the selected connector to transfer the received content update to the content management system that manages content included on the web page.

8. The system of claim 3, wherein the system is configured to add a new connector to support a new content delivery channel and publish content to the new content delivery channel using the new connector.

9. The system of claim 3, wherein publishing content to the web page for the subset of the webpage the user desires to update to reflect the received content update made on the mobile device using the one of the multiple, different mobile authoring templates comprises enabling an update to the web page managed by a content management system from a user that is in a location in which a broadband internet connection is unavailable.

10. The system of claim 3, wherein the operations further comprise:
processing each of multiple inputs defining respective content updates by:
in response to receiving the input defining the content update, determining an identity of the user attempting to make the content update;
determining whether the user attempting to make the content update is authorized to make the content update;
in response to a determination that the user attempting to make the content update is authorized to make the content update for at least some of the multiple inputs, accessing the configuration data for the respective unique identifier associated with the one of the multiple, different mobile authoring templates selected by the user; and
in response to a determination that the user attempting to make the content update is not authorized to make the content update for at least some of the multiple inputs, generating an error condition and preventing the content update.

11. The system of claim 3, wherein invoking content management services needed to publish the received content update to the subset of the web page the user desires to update comprises converting the content update into a proper format and structure for integration into the subset of the web page the user desires to update.

12. The system of claim 3:
wherein invoking content management services needed to publish the received content update to the subset of the web page the user desires to update comprises determining, for each of multiple content updates, whether a content management system supporting the web page requires synchronous or asynchronous transactions; and
wherein publishing content to the web page for the subset of the webpage the user desires to update to reflect the received content update made on the mobile device using the one of the multiple, different mobile authoring templates comprises:
in response to a determination that the content management system supporting the web page requires synchronous transactions, publishing, for a first subset of the multiple content updates, content using a synchronous transaction; and
in response to a determination that the content management system supporting the web page requires asynchronous transactions, publishing, for a second, different subset of the multiple content updates, content using an asynchronous transaction.

13. The system of claim 3:
wherein invoking content management services needed to publish the received content update to the subset of the web page the user desires to update comprises:
validating that the content update includes appropriate information for the content update, and
transforming the content update into a form appropriate for incorporation into the web page; and
wherein publishing content to the web page for the subset of the webpage the user desires to update to reflect the received content update made on the mobile device using the one of the multiple, different mobile authoring templates comprises:
determining publishing activities needed to publish the transformed content update into the web page, and
publishing the transformed content update into the web page using the determined publishing activities.

14. The system of claim 13:
wherein determining publishing activities needed to publish the transformed content update into the web page comprises determining, from among multiple, possible destination devices, a destination device for publishing the transformed content update into the web page, the multiple, possible destination devices including at least a database and a file server; and
wherein publishing the transformed content update into the web page using the determined publishing activities comprises publishing the transformed content update to the determined destination device.

15. The system of claim 3, wherein invoking content management services needed to publish the received content update to the subset of the web page the user desires to update comprises invoking an authorization service to confirm authorization to publish the content update.

16. The system of claim 3, wherein invoking content management services needed to publish the received content update to the subset of the web page the user desires to update comprises invoking a syndication service.

17. The system of claim 3, wherein invoking content management services needed to publish the received content update to the subset of the web page the user desires to update comprises invoking authorization, validation, syndication, and conversion services.

18. The system of claim 3, wherein the operations further comprise, in response to receiving the input defining the content update, placing the content update in a queue until content management services are available to process the content update.

19. The system of claim 3, wherein publishing content to the web page for the subset of the webpage the user desires to update to reflect the received content update made on the mobile device using the one of the multiple, different mobile authoring templates comprises integrating the received content update made on the mobile device using the one of the multiple, different mobile authoring templates into other enterprise content included in the web page.

20. The system of claim 3 wherein:
storing configuration data in association with the unique identifier, the configuration data defining operations needed to publish content updates received through the generated mobile authoring template to the web page, comprises:
  receiving user input describing operations needed to publish content updates received through the generated mobile authoring template to the web page,
  based on the received user input, generating a configuration file that defines all of the operations needed to publish content updates received through the generated mobile authoring template to the web page, and
  storing, in electronic storage, the configuration file in association with the unique identifier;
in response to receiving the input defining the content update, accessing the configuration data based on the unique identifier comprises:
  searching configuration files for the configuration file associated with the unique identifier;
  identifying the configuration file associated with the unique identifier based on the searching; and
  retrieving, from the electronic storage, the configuration file associated with the unique identifier; and
based on the configuration data, invoking content management services needed to publish the received content update to the web page comprises invoking content management services defined within the retrieved configuration file.

* * * * *